July 2, 1940.　　　　P. RHEINLANDER　　　　2,206,618
APPARATUS FOR MEASURING AND DELIVERING GAS QUANTITIES
REDUCED TO A NORMAL CONDITION
Original Filed Aug. 2, 1933

INVENTOR.
Paul Rheinlander
BY
A. D. Adams
ATTORNEY.

Patented July 2, 1940

2,206,618

UNITED STATES PATENT OFFICE 2,206,618

APPARATUS FOR MEASURING AND DE-
LIVERING GAS QUANTITIES REDUCED TO
A NORMAL CONDITION

Paul Rheinlander, Berlin-Wilmersdorf, Germany, assignor to Askania-Werke A. G. vormals Central Werkstatt Dessau und Carl Bamberg-Friedenau, a German company Original application August 2, 1933, Serial No. 683,308. Divided and this application May 14, 1937, Serial No. 142,720. In Germany August 5, 1932

5 Claims. (Cl. 73—199)

This invention relates to apparatus for measuring the flow of gas in terms of standard conditions and this application is a division of my application Ser. No. 683,308, filed August 2, 1933.

In measuring quantities of gas by the volumetric method or the flow measuring method, it is necessary to correct the measurements obtained in respect to pressure, temperature and humidity, if comparable reference magnitudes are to be obtained. Suitable reference magnitudes are standard cubic feet, dry at 0° centigrade and at a pressure of 760 mm. (mercury column) or normal atmospheric pressure. Such corrections of measurements obtained are made by calculating, from the pressure, temperature and humidity content of the gas at the time of making the measurement, the quantity of cubic feet which it would be in dry condition at a pressure of 760 mm. (mercury column) and at a temperature of 0° centigrade.

The conversion of the quantity of gas delivered in standard cubic feet is of special importance in the case of the delivery of large quantities of gas, for example, in supplying gas at a distance. Heretofore, the quantities of gas were measured either volumetrically, by means of ordinary positive displacement gas meters or by the drop in pressure created by an obstruction in the line, and the number of standard cubic feet was then determined by calculation.

One of the objects of the present invention is to provide apparatus for measuring and regulating the delivery of quantities of gas in which all calculations are eliminated and all measurements can be read directly in standard volumetric units.

Another object of the invention is to provide such apparatus wherein the ratio of the absolute temperature and the absolute pressure of the gas as the latter passes a meter, is maintained constant.

Another object of the invention is to provide such apparatus wherein the gas in passing through a suitable measuring apparatus is maintained by automatic pressure-regulating or governing means at a pressure which is always proportional to the absolute temperature of the gas to be measured.

The invention and its aims and objects will be readily understood from the following description of one illustrative apparatus embodying the features of my invention and herein shown for illustrative purposes, the true scope of the invention being more particularly pointed out in the appended claims.

Figure 1:
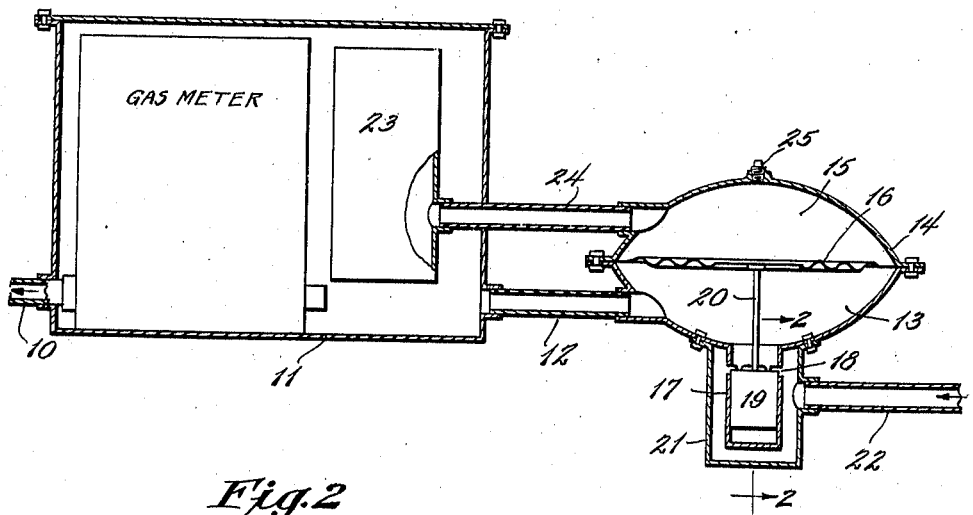
Fig. 1 is a sectional view of one form of regulator or governor associated with a gas meter.
Figure 2:
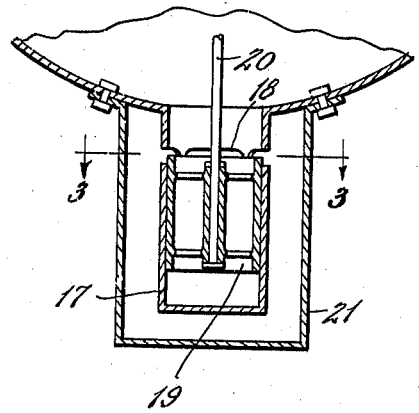
Fig. 2 is an enlarged sectional view taken on the line 2—2 of Fig. 1.
Figure 3:
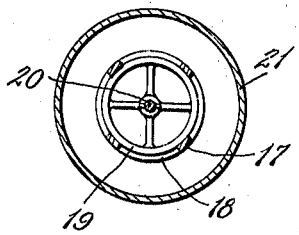
Fig. 3 is a sectional view taken on the line 3—3 of Fig. 2.

Referring to Fig. 1, there is shown an illustrative embodiment of a measuring and regulating device which enables an ordinary positive displacement gas meter to indicate or register directly the volume in cubic feet or other units in terms of standard conditions. In this example, the gas is delivered to the consuming appliances through a service pipe 10 from a gas meter of ordinary design housed within a casing 11. The gas enters the casing through a pipe 12 connected to the lower chamber 13 of a diaphragm casing 14 which also has an upper chamber 15, the two chambers 13 and 15 being separated by a diaphragm 16. Gas enters the chamber 13 through a governing valve having a cylindrical valve casing 17 conveniently forming a vertical extension on the lower half of the diaphragm casing 14 and a series of slots 18 around this extension are controlled by an open cylindrical valve member 19 connected by a stem 20 to the diaphragm 16. The arrangement is such that the upper edge of the cylindrical valve closes or opens the ports or slots 18 as the diaphragm moves the valve up and down. Gas enters the valve casing 17 through a cylindrical housing 21 suitably secured to the lower half of the diaphragm casing around the valve casing and providing an annular space to deliver the gas through the ports or slots. An ordinary service pipe 22 is connected to the housing 21.

Within the available space in the casing 11 of the gas meter there is provided a closed metal gas container in the form of a small tank 23 which is arranged to be influenced by the temperature of the gas passing therethrough and this chamber or container communicates with the upper half 15 of the diaphragm casing or housing through a pipe 24. The storage container 23 is charged with gas at the absolute temperature and absolute pressure at which the volume of the gas is to be determined or measured and the pressure of the gas therein controls or governs the operation of the valve 19; that is to say, the pressure in the diaphragm chamber 15 will counteract the pressure in the diaphragm chamber 13 and the diaphragm will move in response to differences between the pressure in the two chambers. The pressure in the storage tank 23, as will be readily understood by those skilled in the art, is proportional to the absolute temperature of the gas passing through the meter casing. Therefore, the pressure in the diaphragm chamber 13 and within the gas meter casing is maintained proportional to the absolute temperature of the gas according to the following equation:

$$\frac{p}{T}=C$$

wherein $p$ is the absolute gas pressure, $T$ the absolute temperature of the gas and $C$ a constant. In this case, resistance to flow through the conduits is disregarded. The constant is readily determined within desired limits by blowing air or gas into the container or tank 23 until a predetermined absolute pressure in said container or chamber is established at the absolute temperature desired (for example, 0° centigrade).

If water be introduced into the container or gas tank 23, the gas stored therein will become saturated. To enable water to be introduced into the stored gas, there is shown a screw plug 25 in the upper section of the diaphragm casing.

If the main gas current that flows through the meter is saturated with moisture, then the pressure and temperature will again be proportioned by the governing valve so that the meter will register directly the dry volume of the gas in standard units or cubic feet.

The illustrative embodiment shown in Fig. 1 is adapted to measure gas currents through branches wherein the flow through the branches is proportional to the main flow. It may also be used in connection with an ordinary calorimeter to measure the heating value of the gas passing through a branch in B. t. u.'s or other heat units per standard cubic foot or other volumetric units. The pipe 10 may be treated as a branch. Furthermore, the device may be employed in conjunction with large station gas meters from which high pressure gas is delivered to distant points. The regulating or governing device operates in much the same manner as an ordinary pressure reducing valve, except that instead of using a weight as a load for the diaphragm, the load is created by a pressure that is proportional to the temperature of the gas in the container or tank 23. If the gas is regulated in this manner, and allowed to pass through the meter, the latter will indicate directly the volume in standard units or under standard conditions of pressure, temperature and humidity. With such a device, in calculating the volume of the gas, all measurements as to temperature, pressure and humidity content can be eliminated without materially increasing the cost of the apparatus. Many other examples could be cited in which the regulating device, in cooperation with a gas meter, materially reduces the first or capital cost of measuring stations and simplifies the clerical work, thus making for greater accuracy in the measurements obtained.

I am aware that the invention may be embodied in other specific forms without departing from the spirit or essential attributes thereof, and I therefore desire the construction described in the foregoing description to be considered in all respects as illustrative and not restrictive, reference being had to the appended claims rather than to the foregoing description to indicate the scope of the invention.

What is claimed is:

1. In a device of the kind described comprising, in combination, a gas conduit; a first casing arranged in said conduit; a displacement meter arranged in said first casing for measuring the amount of gas flowing through said conduit; a pressure regulating valve also in said conduit connected in series with said meter to control the flow of gas therethrough; a second casing; a diaphragm in said second casing dividing said casing into two chambers connected to actuate said valve and connected to be acted upon on one side by the gas pressure inside said first casing; and a container adapted to be charged with a volume of gas under pressure, exposed with its outside to the temperature of the gas inside said first casing, and communicating with said second casing to act on the other side of the diaphragm.

2. In a device of the kind described comprising, in combination, a gas conduit; a first casing arranged in said conduit; a displacement meter arranged in said first casing for measuring the amount of gas flowing through said conduit; a pressure regulating valve also in said conduit connected in series with said meter to control the gas therethrough and including a cylinder having ports in the cylindrical wall and a piston movable therein and opening and closing said ports upon a relative movement of said cylinder and piston; a second casing; and a diaphragm dividing said second casing into two chambers connected to actuate said valve and connected to be acted upon by the gas pressure inside said first casing on one side and a container adapted to be charged with a volume of gas under pressure, exposed with its outside to the temperature of the gas inside said first casing, and communicating with said second casing to act on the other side of the diaphragm.

3. In a device of the kind described comprising, in combination, a gas conduit; a displacement meter in said conduit for measuring the amount of gas flowing through said conduit; a regulating valve in said conduit connected in series with said meter; pressure responsive means connected to control said regulating valve and acting in one direction in response to the absolute pressure of the gas passing through said meter; and temperature responsive means also connected to control said regulating valve acting in opposition to the pressure of the gas and in response to the absolute temperature of the gas, said temperature responsive means including a member arranged in the gas flow at a point having the same temperature as the gas in said meter, whereby the ratio between the absolute pressure and the absolute temperature of the gas passing the meter will be kept constant.

4. In a device of the kind described comprising, in combination, a gas conduit; a casing arranged in said conduit; a displacement meter arranged in said casing for measuring the amount of gas flowing through said conduit; a regulating valve in said conduit connected in series with said meter; pressure responsive means connected to control said regulating valve and acting in one direction in response to the absolute pressure of the gas in said casing; temperature responsive means connected to control said regulating valve acting in opposition to the pressure of the gas and in response to the absolute temperature of the gas in said casing, said temperature responsive means including a member arranged in said casing so as to be exposed to the same temperature as the gas in said meter, whereby the ratio between the absolute pressure and the absolute temperature of the gas passing the meter will be kept constant.

5. In a device for measuring the amount of gas flowing through a gas conduit comprising, in combination, a displacement meter in said conduit; a regulating valve also in said conduit connected in series with the displacement meter; pressure responsive means operatively connected to said valve and arranged in the gas stream between the valve and said displacement meter, said pressure responsive means being operative in one direction to control the valve in response to the gas pressure existing in said meter; and means responsive to the absolute temperature existing in said meter also connected to act on said valve in opposition to the pressure of the gas.

PAUL RHEINLANDER.